United States Patent [19]

Rodgers

[11] 4,361,760
[45] Nov. 30, 1982

[54] TWO-DEGREE-OF-FREEDOM GYRO WITH RADIANT ENERGY PICKOFFS

[75] Inventor: Aubrey Rodgers, Huntsville, Ala.

[73] Assignee: The United States of America as represented by the Secretary of the Army, Washington, D.C.

[21] Appl. No.: 201,678

[22] Filed: Oct. 29, 1980

[51] Int. Cl.[3] .................... G01C 19/28; G01D 5/28
[52] U.S. Cl. ...................... 250/231 GY; 74/5.6 A
[58] Field of Search ................ 74/5.6 A, 5.12; 250/231 GY, 231 SE, 211 K; 73/504, 505

[56] References Cited

U.S. PATENT DOCUMENTS

| | | | |
|---|---|---|---|
| 2,959,060 | 11/1960 | Kunz | 74/5.6 A |
| 3,277,304 | 10/1966 | Vyce | 74/5.6 A X |
| 3,328,595 | 6/1967 | Todd | 74/5.6 A X |
| 3,399,347 | 8/1968 | Martens | 250/231 SE X |
| 3,422,686 | 1/1969 | Unruh | 74/5.6 A |
| 3,499,332 | 3/1970 | Fingerett et al. | 74/5.6 A |
| 3,836,260 | 9/1974 | Ulyanov et al. | 250/231 SE X |
| 3,915,019 | 10/1975 | Zoltan | 74/5.6 A |
| 3,940,609 | 2/1976 | Johnstun | 250/231 SE |

Primary Examiner—Rodney H. Bonck
Attorney, Agent, or Firm—Nathan Edelberg; Robert P. Gibson; Harold W. Hilton

[57] ABSTRACT

A two-degree-of-freedom gyro that uses a combination of fiber optics and radiant energy sensors for low torque gimbal/housing position sensors. The mode of operation of the gyro is a sustained rotor displacement type instrument. The radiant energy type pickoffs eliminate gimbal wiring, slip rings, and wiper environmental problems.

1 Claim, 5 Drawing Figures

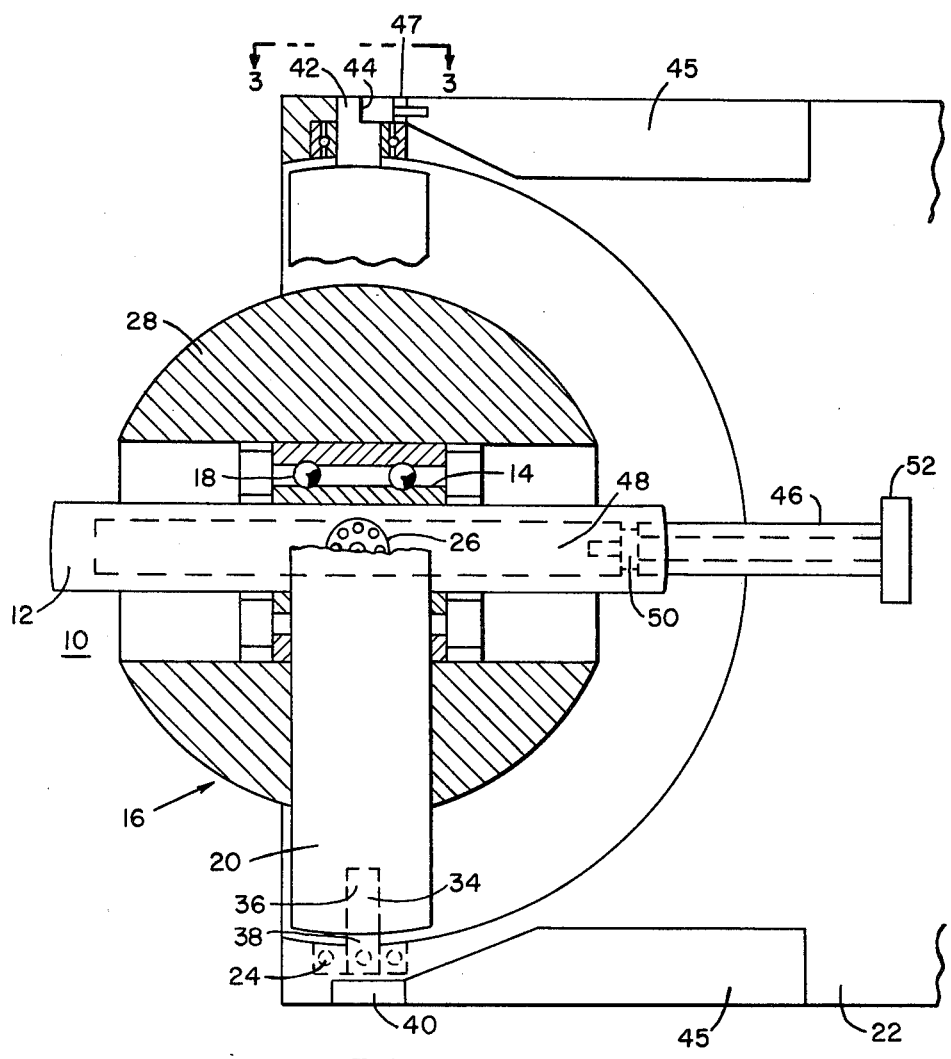
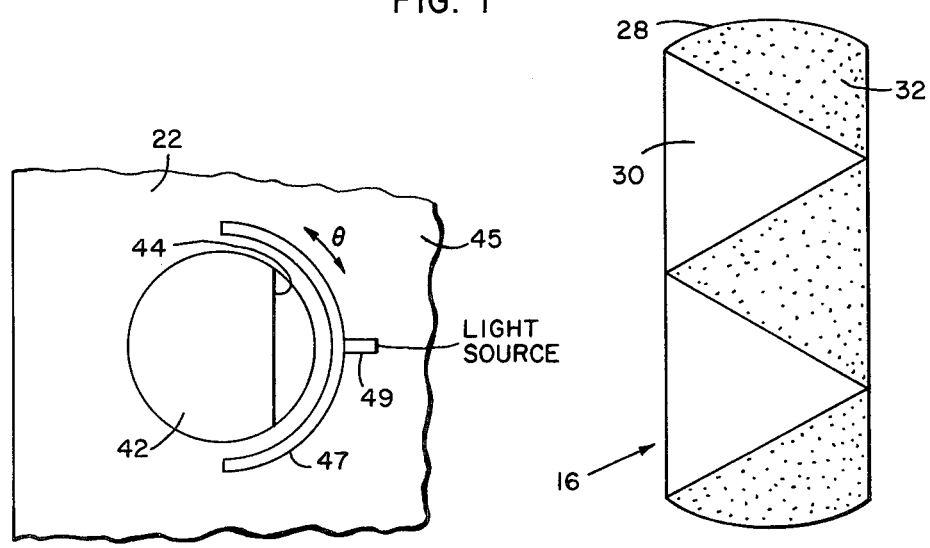
FIG. 1
FIG. 3
FIG. 2

TWO-DEGREE-OF-FREEDOM GYRO WITH RADIANT ENERGY PICKOFFS

DEDICATORY CLAUSE

The invention described herein may be manufactured, used, and licensed by or for the Government for governmental purposes without the payment to me of any royalties thereon.

BACKGROUND OF THE INVENTION

Typical gimbal potentiometer type pickoffs and slip ring designs have problem areas on present gyros, such as wiper lift-off during flight environment, noise, increased friction, and assembly cost. The pickoff of the present invention utilizes a combination of fiber optics and radiant energy for low torque gimbal/housing position sensors to eliminate gimbal wiring torques.

SUMMARY OF THE INVENTION

A two-degree-of-freedom gyro utilizing transmitted/reflected radiant energy as wide angle pickoffs. The assembly includes a housing having an outer gimbal mounted therein. An inner gimbal is concentrically mounted in the outer gimbal. A rotor is mounted in the inner gimbal and is provided with a reflective/non-reflective pattern thereon. Fiber optics are carried in the gimbal assembly to transmit light to the reflective/non-reflective pattern and from the pattern to electronic sensors carried in the housing. A flat surface is provided on the outer gimbal shaft to reflect radiant energy therefrom to sensors carried by the housing.

BRIEF DESCRIPTION OF THE DRAWINGS

FIG. 1 is an elevational view of a gyro utilizing the radiant energy pick off system of the present invention.

FIG. 2 is an elevational view of the rotor having a reflective/non-reflective pattern thereon.

FIG. 3 is a sectional view along line 3—3 of FIG. 1.

DESCRIPTION OF THE PREFERRED EMBODIMENT

Figure 4:
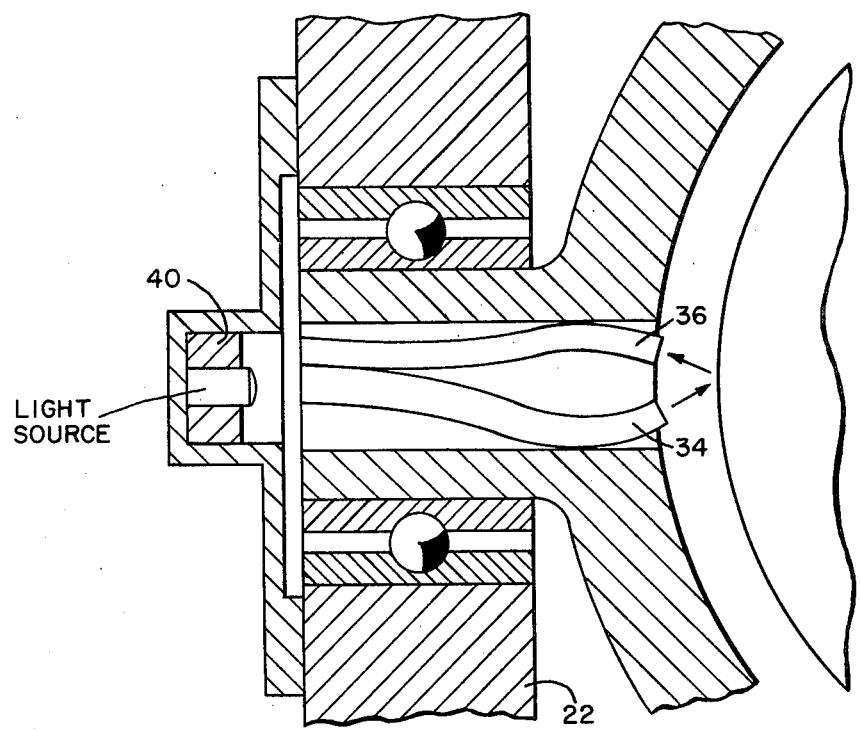
FIG. 4 is an elevational view illustrating the fiber optics path in the gyro assembly.

As seen in FIG. 1, a wide angle gyro 10 includes an inner gimbal 12 having a spin bearing shaft 14 attached thereto. A rotor 16 is decoupled from shaft 14 through bearings 18. An outer gimbal frame 20 is carried in housing 22 and decoupled therefrom by gimbal bearings 24.

Inner gimbal frame 12 is decoupled from outer gimbal frame 20 through bearings 26. Rotor 16 is provided on its outer surface 28 with a reflective/non-reflective pattern 30 and 32. Fiber-optics 34 and 36 (FIGS. 1 and 4) are located concentric through a hole 37 on outer gimbal shaft 38 for transmitted/reflected energy paths from energy source (not shown) to rotor reflective/non-reflective pattern 30 and 32 and back to a sensor 40 such as a photodetector carried on gimbal housing 22. A second housing 45 forming part of gimbal housing 22 encloses the energy source and data processing sensor/electronics for inner gimbal pickoff sensor 40. (Which may also be a GaAs laser diode and logic chip).

An outer gimbal shaft 42 decouples the outer gimbal from the housing and includes a reflective flat surface 44 for outer gimbal position sense. Housing 45 secured to housing 22 encloses the energy source and data processing sensor/electronics for outer gimbal reflective surface 44 position intelligence. The sensor 47 may be a photodetector carried adjacent surface 44. A light source is directed through an aperture 49 to flat surface 44.

The electronics carried in housing 45 are used to generate an electric signal from the reflected radiant energy to indicate gimbal position. Such structure is well known in the art and is not encompassed in the inventive concept of the present invention.

Hollow shaft 46 provides gimbal/housing cage and gas energy for rotor spin up. Conduit 48 provides stored gas energy for rotor sustain supply. Valve 50 is an open/shut valve for sustainer gas bottle (not shown). An explosive device 52 is used to activate rotor spin-up and to uncage the gimbal from housing 22. The uncage activation opens valve 50 thus releasing energy to sustain rotor 16 and automatically closes entrance to spin-up line 46. The caging, uncaging, spin-up and sustain mechanisms are well known in the art.

In operation, the explosive device 52 energizes rotor 16 to required rpm. Exhausted spin-up gas supply retracts gas line 46 thus uncaging gimbal 12 from the housing. The uncaging opens valve 50 of gas bottle 48 and automatically closes spin-up line 46. Gas bottle 48 provides gas energy through gimbal 12 spin-up nozzles (not shown) to maintain inertial reference rpm. Missile body motion coupled through housing 22 is sensed by the inertial reference patterns 30 and 32 and gimbal shaft reflective surface 44. Radiant energy transmitted through fiber optic path 34 and reflected from the reflective/non-reflective pattern is returned through fiber optic path 36 onto sensor 40 and to the electronics package (not shown). The processed radiant energy data represents a digital form of the inner gimbal angle between the inertial reference 16 and housing 22. Light source 49 provides transmitted radiant energy onto reflective surface 44. The radiant energy is returned to sensor 47 and to electronics carried in housing 45. The processed radiant energy in housing 45 represents an analog signal of the outer gimbal angle between the reflective surface 44 and housing 22. The structure provides missile body attitude information by utilizing body mounted radiant energy sources and sensors to measure the angle between the inertial reference 16 and missile body 22.

The energy source utilized in the present invention may be integrated GaAs laser diodes and logic chips or light emitting diodes (LED).

FIG. 4 illustrates the fiber optics path to and from rotor 16. Radiant energy is directed through path 34 to the rotor. Path 36 directs the radiant energy to a sensor disk 40 carried by the gyro assembly.

Figure 5:
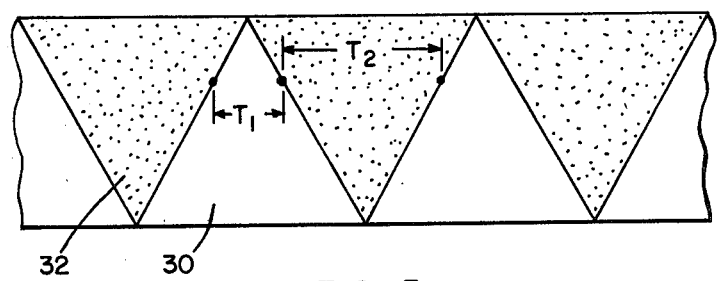
FIG. 5 is a diagrammatic view illustrating the pulse duration modulation pick off system of the present invention.

FIG. 5 illustrates the relationship between the reflective/non-reflective patterns of the gyro pick-off.

The gyro pickoff output is in the form of pulse duration modulation (PDM) electrical signals. The PDM is defined by the equation:

$$M = \frac{T_1 - T_2}{T_1 + T_2}.$$

The term $T_1$ is the duration of the reflective signal, and $T_2$ is the duration of the non-reflective signal. Time intervals $T_1$ and $T_2$ are equal at null, thus representing zero-percent modulation. The modulation factor, M, is equal to some numerical value when time intervals $T_1$ and $T_2$ are unequal. This numerical value represents the angular gyro case displacement about the corresponding input axis.

The following is a discussion of fiber optics as utilized in the inventive concept of the present invention.

Fiber optics is based on the ability of smooth strands of transparent materials to conduct radiant energy with high efficiency. The radiant energy conducted by a fiber is reflected from the walls by total internal reflection made virtually lossless by coating or cladding the walls with a transparent layer of material having a low refractive index than that of the fiber. The cladding protects the fiber interface from scratches and dust and also prevents leakage of radiant energy.

Optical fibers are made of glass, optical plastics, or fused silica. Glass fibers are used in applications requiring radiant energy transfer either in flexible bundles or in rigid fiber optic face plates. (A face plate is made from a large number of short fibers aligned side by side and fused together to form a solid plate. This type is used to transmit coherent radiant energy images that can be viewed under bright, direct light). Plastic fibers are used in low-cost illumination applications. Fused silica fibers are used as low-loss transmission lines.

Bundles of fibers without any systematic alignment of the individual fiber ends, called light wave guides, are used to transmit radiant energy along flexible paths for various distances depending on the attenuation properties of the fibers. A wave guide that consists of cladded fibers grouped together is known as a non-coherent bundle and probably is the most widely used of all fiber optic components. The diameter of the individual fibers varies from approximately 50 to 200 micrometers. The bundle is very flexible, with minimum bending radius determined by the protective cladding rather than the fibers. The term step-index is applied because the index of refraction of the core is constant with radius and is 1% to 5% greater than that of the cladding.

Because of the principle of total internal reflection, radiant energy is reflected at the core/cladding interface and thus guided through the fiber. Common types are:

Silica-cladding/silica-core (the lowest-loss, highest bandwidth).

Plastic-cladding/silica-core (suitable for moderate distance).

Plastic-cladding/plastic-core (high loss). Special fuzed silica and modified silica optical fibers have attenuations as low as 2 dB/km in the near infrared portion of the spectrum.

Attenuation in either type of fiber is caused by absorption principally due to impurities in the core material, and by scattering due to inhomogencities and inclusions in the core. An important consideration in the manufacture of low-loss glass fibers is avoidance of water absorption as the glass is processed. In a modified doped-deposited-silica process, hydroxal-ion content is very low, the resulting attenuation is very low, typically 6 dB/km at 850 nm or fused silica fiber having 20 to 100 dB/km.

If the fiber core is free of inclusions or defects which can cause radiation scattering and loss, it will display an intrinsic scattering caused by density fluctuations.

Attenuation of fiber optics is customarily expressed in decibels, and is usually normalized to one-kilometer reference length. Thus, from powers transmitted and received over a length of L kilometers, $$\frac{10 \log_{10} \frac{P \text{ rec'd}}{P \text{ trans}}}{L} \text{ (dB/km)}.$$

Optical-power loss can be thought of in the same way as the ohmic loss of conventional wire, for which the linear resistance is known and the potential drop is easily calculated.

Attenuation of a particular fiber is a function of the transmitting source's optical wavelength. In comparing fiber specifications a designer should consider loss figures for a given wavelength, such as 850 nm.

A radiant energy pulse entering an optical waveguide undergoes an increase in bandwidth while traversing the length of the fiber. This is due to both material properties and the geometry of propagation, described mathematically as modes.

Bandwidth is limited by the broadening of pulses being transmitted through a given fiber. Such broadening occurs when different modes arrive at the sensor at different times. This model dispersion is due to the unequal mode velocities and obvious path-length differences in step-index fibers. Step-index fibers are those in which the index of refraction is constant in the fiber and has an abrupt "step" at the surface. Some fibers available are:

Multi-step, having more than one abrupt change of index of refraction.

Graded-index fiber, in which index of refraction varies in the fiber, usually decreasing approximately parabolically from the center to the surface. The parabolic refractive-index profile of a graded-index fiber greatly reduces such dispersion and, as a result, a graded-index fiber can have substantially greater bandwidth, usually several hundred megahertz for a 1 km reference length.

Another important optical parameter of interest is the numerical aperture. The numerical aperture (NA) is a measure of the maximum acceptance angle for light propagation in the fiber, at angles larger than this, there is no longer total internal reflection.

$$NA = \sin \theta = \sqrt{n_1^2 - n_2^2}$$

where
$\theta$ = one half of the input core angle.
$n_1$ = index of refraction of core.
$n_2$ = index of refraction of cladding.

This is the sine of the half-angle within which the fiber can accept or radiate energy. High numerical aperture implies greater coupling efficiency between the radiant source and fiber. Thus a high NA fiber can be used effectively with an inexpensive low-brightness LED. However, NA is a function of the core-to-cladding index difference. For this reason, an increase in NA usually is accompanied by higher attenuation and lower bandwidth.

In radiant energy wave guide applications, it is possible to modify the end configurations to any desired geometrical form. Alternatively, one bundle may be divided into several branches to provide several radiant energy outputs. In such arrangements, only the total area of the fiber bundle must be maintained at both ends of the system since the individual fibers are of uniform size.

I claim:

1. A two-degree-of-freedom gyro utilizing transmitted/reflected radiant energy as wide angle pickoffs comprising:
   a. a housing;
   b. an outer gimbal carried in said housing, said outer gimbal having a pair of shafts extending from opposite sides thereof for support of said outer gimbal in said housing, the first of said pair of shafts being hollow, the second of said pair of shafts having a flat reflective surface thereon;
   c. an inner gimbal carried in said housing in concentric relation with said outer gimbal;
   d. a rotor carried in said inner gimbal, said rotor having a reflective/non-reflective pattern on the outer surface thereof;
   e. a first source of light for directing radiant energy against said flat surface of said shaft;
   f. detector means carried in said housing adjacent said flat surface of said shaft for receiving reflected radiant energy from said flat surface for providing a signal indicative of the position of said shaft relative to said housing;
   g. a second source of light for directing radiant energy against said reflective/non-reflective pattern;
   h. filter optics means carried in said hollow shaft for directing radiant energy from said second light source to said reflective/non-reflective pattern and for directing reflected radiant energy away from said reflective/non-reflective pattern; and
   i. sensor means for receiving said reflected radiant energy from said reflective/non-reflective pattern.

* * * * *